United States Patent

[11] 3,573,520

| [72] | Inventor | Richard C. Dorshimer<br>Longmeadow, Mass. |
|---|---|---|
| [21] | Appl. No. | 870,769 |
| [22] | Filed | Sept. 19, 1969<br>Division of Ser. No. 608,377, Jan. 10, 1967 |
| [45] | Patented | Apr. 6, 1971 |
| [73] | Assignee | United Aircraft Corporation<br>East Hartford, Conn. |

[54] ROTATING BODY HAVING COMBINED POWER GENERATING AND SIGNAL COUPLING SYSTEM
3 Claims, 3 Drawing Figs.

[52] U.S. Cl. ............................................. 310/168,
310/67, 416/61
[51] Int. Cl. ...................................................... H02k 19/20
[50] Field of Search............................................ 310/67,
168, 169, 170, 175, 176; 340/195; 416/61 (X), 155

[56] References Cited
UNITED STATES PATENTS

| 2,117,019 | 5/1938 | Conrad............................. | 310/169 |
| 3,132,337 | 5/1964 | Martin............................... | 310/170 |
| 3,179,825 | 4/1965 | Terry................................. | 310/67 |
| 3,435,267 | 3/1969 | Beyersdorf......................... | 310/168 |
| 3,317,765 | 5/1967 | Cone.................................. | 310/67 |

*Primary Examiner*—Milton O. Hirshfield
*Assistant Examiner*—R. Skudy
*Attorney*—Milvin Pearson Williams ABSTRACT: A rotatable member is disposed for rotation in proximity with a stationary body, the rotatable member having an annular capacitive plate adapted for rotation immediately adjacent a plurality of magnetic teeth on the stationary body, the teeth and the annular plate forming a capacitor for coupling signals between the stationary body and rotatable member. At one point in the annular member is a magnetic head having a winding, the magnetic head passing over successive ones of the magnetic teeth generating electric current which is utilized on the rotating body to operate a transducer circuit, the output signal of which is coupled back through the capacitive coupling formed by the teeth in the annular surface to monitoring equipment located on the stationary body. The transducer circuit may include a power rectifier and voltage regulator which operates strain gauges, amplifiers and voltage control oscillators, the outputs of the voltage control oscillators may be multiplexed in the mixer prior to returning as a signal through the capacitive coupling.

Patented April 6, 1971

INVENTOR
RICHARD C. DORSHIMER

Melvin Pearson Williams
ATTORNEY

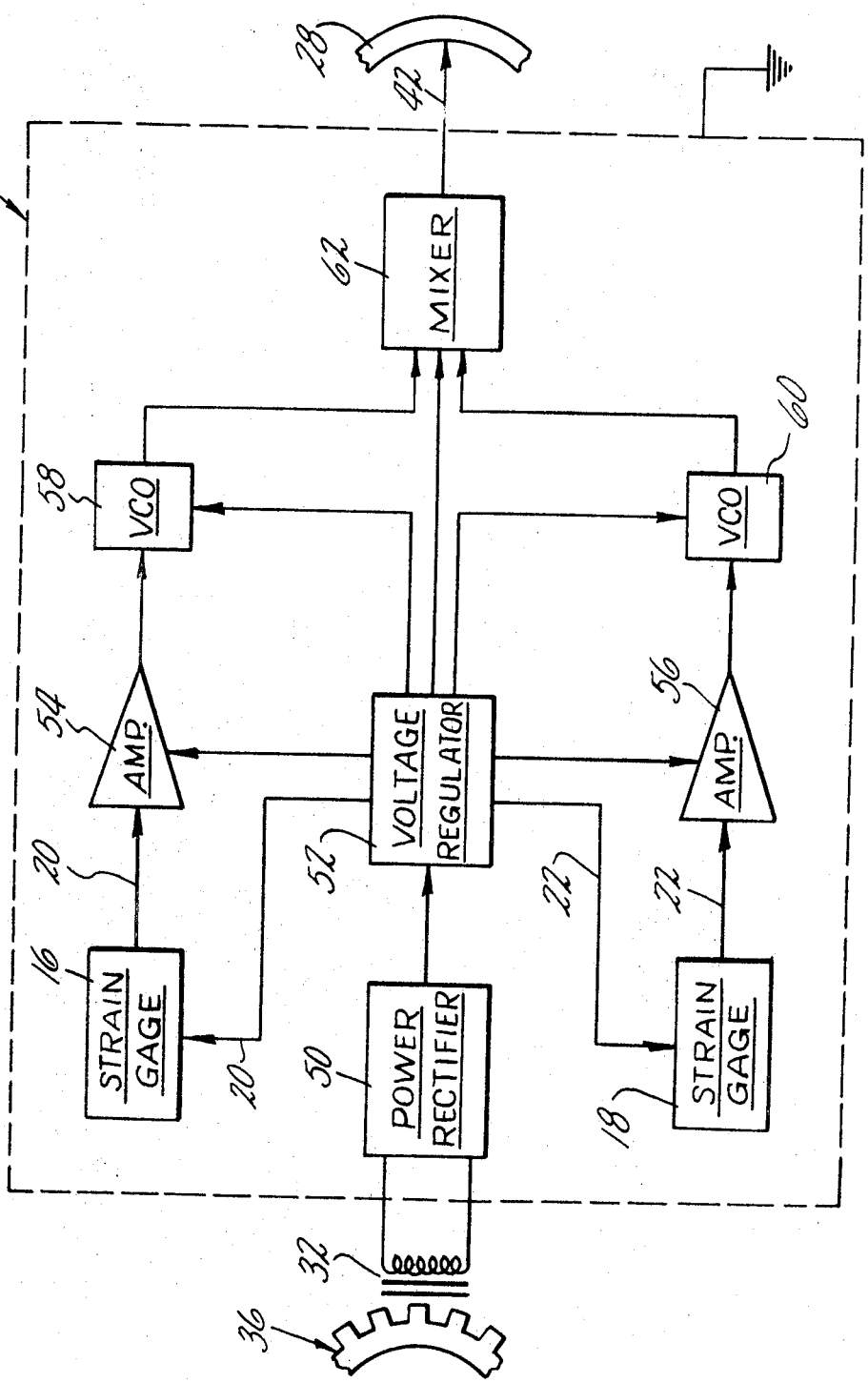

ROTATING BODY HAVING COMBINED POWER GENERATING AND SIGNAL COUPLING SYSTEM

CROSS REFERENCE TO RELATED APPLICATIONS

This application is a division of my copending application Ser. No. 608,377, filed on Jan. 10, 1967 and entitled SYSTEM FOR MEASUREMENT OF PROPERTIES ON ROTATING BODY.

BACKGROUND OF THE INVENTION

1. Field of Invention

This invention relates to electrical measurements, and more particularly to an improved system for effecting electrical excitation of, and for transmitting resultant manifestations from, electrical apparatus suitable for performing measurements on a rotating body.

2. Description of the Prior Art

Measurement of properties on rotating bodies have heretofore been made with systems incorporating slip rings for the transfer of electrical energy to the rotating body in order to excite the measuring apparatus thereon, together with slip rings for conducting electrical manifestations of the measured quantity from the rotating body to a nonrotating portion of the system. In the nonrotating portion of the system, there is therefore generally a power supply, and apparatus for either monitoring the electrical measurement so made, or for transmitting manifestations related thereto to a still further remote monitoring station. This latter method is known commonly as "telemetry." Regardless of the utilization of the manifestation of the quantity measured, the means needed to transfer the energy from the rotating body under test to a stationary or nonrotating portion of a frame, object or apparatus, is a critical portion of any such system. Recent innovations in this form of measurement have utilized capacitive coupling between the rotating and stationary portions of the system, which reduces cost, and overcomes problems of brush wear on the slip rings. However, such systems have been subject to greater problems in achieving a high signal-to-noise ratio, since the capacitor represents a somewhat significant impedance in the line of the electrical manifestations of the measured quantity which are represented by amplitude modulated signals.

SUMMARY OF INVENTION

An object of the present invention is to achieve the advantages of capacitive coupling in the electrical connection of a rotating body with a stationary body.

Another object of the present invention is provision of electrical coupling means for electrically coupling a rotating body to a stationary one, which means may be attached to the rotating body other than by slipping the means over the end of a shaft or other axis of rotation.

Still other objects of the present invention are: elimination of coupling of an excitation source to measurement apparatus on a rotating body; provision of improved electrical excitation of rotating body measurement apparatus; and provision of an independent power source for electrical measurements on a rotating body.

In accordance with the present invention, results of electrical measurements are manifested in the form of frequency modulated signals, whereby there is little or no change in signal-to-noise ratio as a result of utilization of a series capacitive coupling between a rotating body upon which the measurements are made, and a stationary body upon which the measurements are monitored or from which the measurements are transmitted to a further monitoring station.

According to another aspect of the invention, an electrical power source comprises elements cooperating between a rotating body and a nonrotating frame so that the electrical power is produced right on the rotating body, rather than on the stationary portion of the system whereby the excitation power need not be transferred through slip rings, capacitive coupling, or other expedients, to the rotating body.

According to a further aspect of the present invention, the capacitive coupling means is combined with the electrical excitation generator.

In a typical utilization of the present invention, strain gauges are mounted on the propellers of an aircraft. Excitation power is provided to the strain gauges via the rectified and regulated output of an alternating current generator which is mounted on the barrel, spinner bulkhead, or afterbody bulkhead of the propeller. Mounted adjacent to and in the same plane as the magnetic transducer element of the generator are sections of a capacitor rotor; the sections of capacitor rotor and the magnetic head of the generator, when mounted, comprise a solid ring, separated only by minute discontinuities which are the result of the ring being comprised of a plurality of pieces. Mounted on the stationary propeller control housing is a stator which comprises a plurality of teeth having a size and spacing so as to achieve a rate of change of flux in the magnetic head which is required to obtain a suitable magnitude of primary power for the equipment mounted on the rotating propeller assembly; this is rectified and regulated to provide circuit power. The stator also comprises the nonrotating plate of the capacitive coupling element. Thus, both the excitation of the devices and the transfer of electrical manifestations therefrom are achieved through a single, toothed stator. The power generator operates in the same general fashion as any alternator or AC-voltage generator in that there is a change in the lines of the flux which cut the coil wrapped upon the magnetic head so as to generate alternating current.

An alternative form of stator may comprise a solid ring of magnetic material having alternately-poled magnetic fields permanently recorded therein.

The invention eliminates the need for batteries to be placed upon the rotating object, or for additional electrical connections between the rotating and static portions of the system, thereby eliminating additional trouble spots and eliminating the possibility of introduction, into the measurements, of variations due to the transmission to the rotating body of the excitation power for the measurement to be made.

The invention, by utilizing FM data transmission, also overcomes the signal-to-noise problem inherent in capacitive couplings between rotating and stationary objects in electrical measurement systems heretofore available. The invention is readily achieved at relatively low cost, and provides a combination of functions in the hardware utilized.

Another feature of the invention is that since capacitive coupling is used, there is no need for the placement upon the rotating object (such as propeller barrel or propeller-spinner bulkhead) of a single, continuous ring, but rather, the magnetic head and capacitive rotor segments may be placed about the spinner bulkhead or other portion of the rotating propeller housing without the need for disassembly of the propeller or the propeller shaft.

A further feature of the present invention is that the power generated by the generator may itself be included in the multiplex and coupled to the aircraft as a direct indication of propeller speed.

Other objects, features and advantages of the present invention will become more apparent in the light of the following detailed description of a preferred embodiment thereof as illustrated in the accompanying drawings.

BRIEF DESCRIPTION OF THE DRAWING

FIG. 2 is a simplified schematic block diagram of a measurement system in accordance with the present invention.

DESCRIPTION OF THE PREFERRED EMBODIMENT

Figure 1:
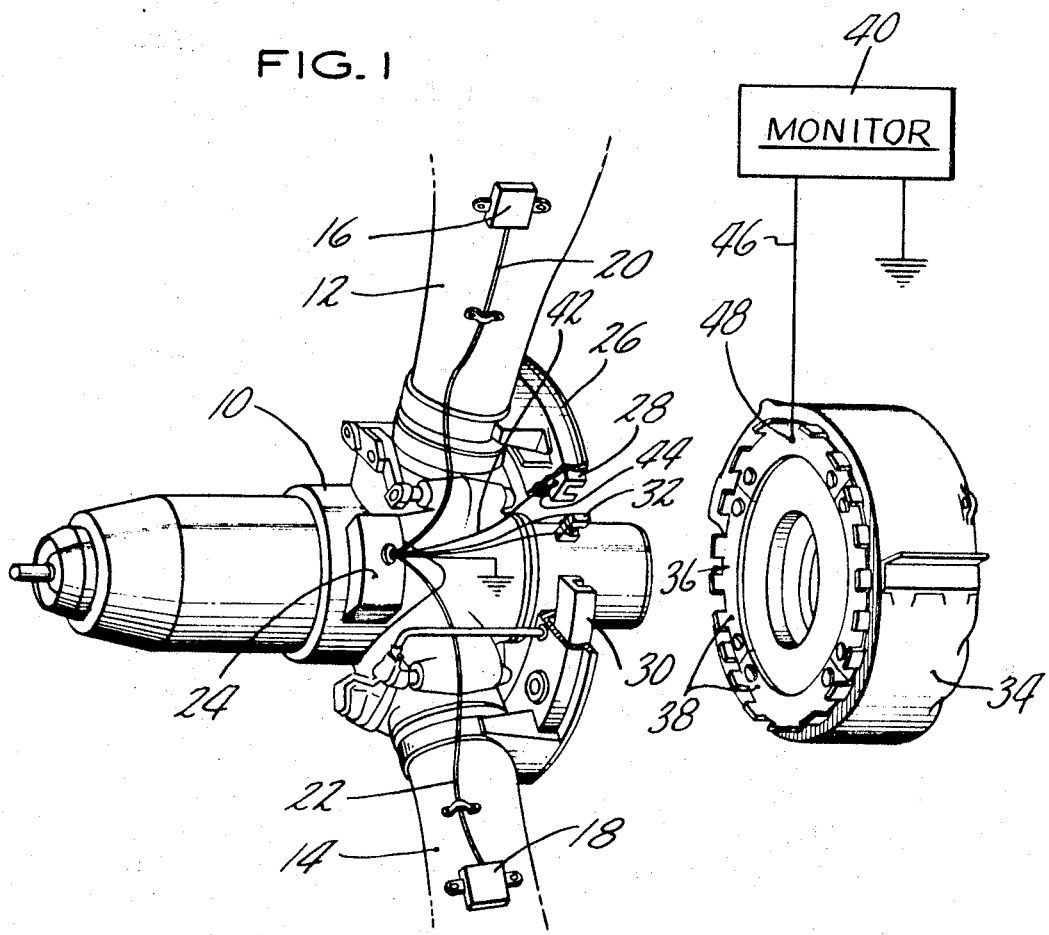
FIG. 1 is a semipictorial, simplified illustration of portions of a propeller assembly adapted in accordance with the present invention.

A portion of a propeller assembly is illustrated in FIG. 1, wherein a main frame or housing of the rotary part of the system comprises a propeller barrel 10 to which are attached propeller blades 12, 14 upon which may be affixed electric strain gauges 16, 18, in accordance with an illustrative embodiment of the present invention. The strain gauges 16, 18 are each connected by suitable interconnecting wires 20, 22 to a solid state circuit module 24, the details of which are illustrated in FIG. 2. At the rear of the propeller barrel 10 there is mounted a spinner bulkhead 26 to which capacitor rotor elements 28, 30 and a magnetic head 32 may be mounted. When properly assembled for operation on an aircraft, the propeller assembly is suitably affixed to the stationary portion of the aircraft so as to achieve mechanical linkage with the appropriate portions of a nacelle, which includes a propeller control housing assembly 34. Affixed to the propeller control housing assembly 34 is a stator 36 which may be comprised of individual segments 38 or which may be made all in one piece, as suits the design expedients of any particular application of the present invention.

Electrical connection between the solid state circuit module 24 and suitable monitoring equipment 40 is made by connection to the capacitor rotor 28 through a suitable electrical conductor 42 which may be affixed to the capacitor rotor 28 in any suitable manner as is illustrated at reference 44. Similarly, the stator may have affixed an electrical conductor 46, such as at the connection point 48, the conductor 46 applying the signals received at the stator 36 to a monitor 40. If the stator is somewhat remote from the monitor, then a suitable driver amplifier may be connected therebetween. The other side of the line interconnecting the solid state circuit module 24 and monitor 40 may be the ground which is inherently provided in the mechanical portion of the propeller assemblies, including, but not necessarily requiring, the grounding connections utilized for elimination of electrostatic charge buildup. Thus, an alternating current signal will be transposed from the circuit module which is affixed and rotates with the propeller barrel to the monitor 40 which is placed in some suitable portion of the aircraft by means of ground through the mechanical combination of the propeller housing on the one hand, and through the capacitive coupling between the capacitor rotor 28, 30 and the stator 36 on the other hand. The capacitor is simply used as a series coupling element in conjunction with a suitable input impedance in the monitor 40, so the primary design consideration for the capacitor in accordance herewith is that it provide a time constant consistent with the lowest frequency of carrier signal employed.

The stator 36 may be comprised of a soft ferrous material so as to provide proper change of flux at the magnetic head 32 to generate electric current in the winding of the magnetic head 32 as it revolves about the stator. Since the coupling for the signal is capacitive, the fact that the stator is not a highly conductive material is not important; there is sufficient material within the bulk of the stator 36 so that it will readily conduct current which is coupled thereto capacitively, and the capacitive coupling between the capacitor rotor elements 28, 30 and the stator 36 depend not upon the conductance of the material, but rather upon the spacing, dielectric and surface area, as is well known in the art. The stator 36 may alternatively include magnetized elements so as to provide an even greater energy generation at the output of the magnetic head 32; the particular design of the stator 36 is not germane to the invention, but rather relates to details of design in any given implementation of the invention.

Referring now to FIG. 2, the solid state circuit module 24 is shown to include a rectifier 50 for rectifying the alternating current generated in the magnetic head 32, the output of the rectifier 50 being applied to a voltage regulator 52. Voltage regulator 52 supplies suitable power to the strain gauges 16, 18 and to amplifiers 54, 56 and voltage controlled oscillators 58, 60 corresponding to each of the strain gauges 16, 18. Although two channels of information (one corresponding to each strain gauge 16, 18) are illustrated in FIGS. 1 and 2 herein, it should be understood by those skilled in the art that any number of channels of information may be utilized without departing from the principles of the present invention. Each strain gauge 16, 18 will respond to the conditions extant within the respective propeller blade 12, 14 so as to develop an amplitude-varying signal for application to the related amplifier 54, 56.

The output of the amplifiers 54, 56 are applied to corresponding voltage controlled oscillators 58, 60 so as to convert the amplitude variation into a frequency variation, whereby the measurement results are manifested in frequency-modulated signals.

The output of each of the voltage-controlled oscillators 58, 60 is applied to a mixer circuit 62 where the signals are combined into a multiplexed format, which may be in accordance with any one of several suitable well-known multiplexing techniques. For instance, time division multiplexing may be used by chopping up the signals and sending a signal from each of the information channels in an interleaved fashion to modulate one of the VCOs, or a direct frequency multiplexing of the FM signals may be utilized as illustrated in FIG. 2. The method of multiplexing is not important to the present invention, and the prior art is replete with various teachings suitable for implementing the generation of a composite signal for application over the electrical conductor 42 to the capacitor rotor segment 28.

In connection with FIG. 2, it should be understood that the function of the apparatus therein is to develop power, apply the power to circuit elements and to transducers for measuring a quantity, to utilize the property-varying output of the transducers to develop frequency modulated manifestations of the conditions being measured, and to mix the outputs of the various information channels so described so as to provide a single conductor with the manifestations of properties being measured, the conductor applying these manifestations to the rotor of the capacitor such as to rotor segment 28 as shown in FIG. 2. The particular nature of the individual circuits are all well known, and are not germane to the present invention.

Figure 3:
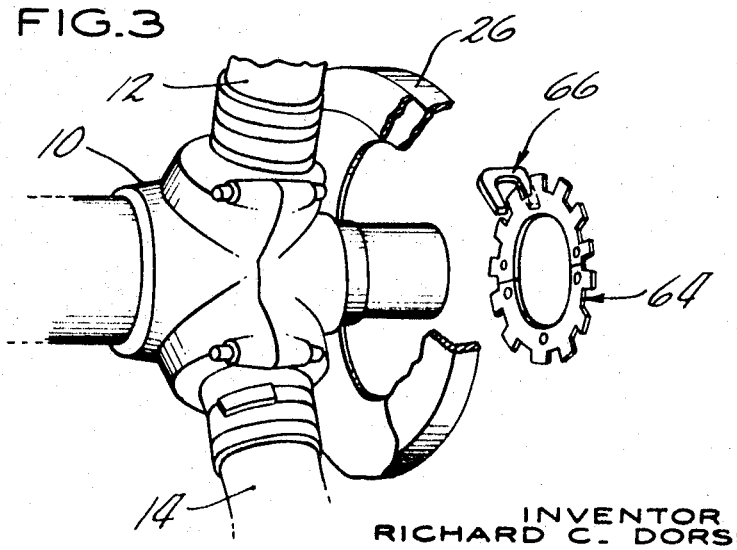
FIG. 3 is an alternative rotor/stator combination suitable for use in the embodiment shown in FIG. 1.

Referring now to FIG. 3, an alternative form of rotor and stator elements includes a stator 64 having radial teeth (in contrast with the peripheral teeth of the stator 36 illustrated in FIG. 1). A magnetic head 66 is suitably mounted on the spinner bulkhead or afterbody bulkhead 26 or to some other suitable portion of the rotating propeller barrel housing 10. FIG. 3 illustrates that the invention herein disclosed may be implemented in a variety of forms, there being a relatively small functional difference between radial and peripheral tooth arrangements on the stator 35, 64.

The inherent advantages of the system in accordance with the present invention include the fact that signal-to-noise ratio is no longer critical in capacitive coupling of electrical indicia from a rotating member to an adjacent stationary body. Because of the fact that electrical manifestations of a measured quantity are applied to a rotating capacitive coupling in the form of frequency modulated manifestations, the inherent noise-responsive characteristics of the capacitor, absolute value of capacitance, and dynamic variations of capacitance are rendered relatively insignificant compared with the variations in the frequency of the frequency modulated signal, which variations are the indicium desired.

The embodiments herein disclosed relate to provision of excitation power for, and transfer of quantity measuring indicium from electrical test circuitry for use on a rotating body in conjunction with a stationary object or body; whether the signal is used to directly operate monitoring equipment (such as in the cockpit of an aircraft), or used as a source of transmitted energy in a telemetry system for remote monitoring or recording, is immaterial to the present invention, and further disclosure relating thereto is believed unwarranted.

Although the invention has been shown and described with respect to preferred embodiments thereof, it should be obvious to those skilled in the art that the foregoing and other changes and omissions and the form and detail thereof may be made therein without departing from the spirit and scope at the invention.

I claim:

1. A power-generating and signal-coupling system comprising:
   a stationary body including a stator comprising a plurality of magnetic teeth arranged annularly about an axis and electric signal responsive monitoring means electrically connected to said stator; and
   a rotatable member adapted for rotation about said axis, said rotatable member having an annular capacitor rotor surface adapted to rotate in close proximity with the teeth of said stator, said annular surface and said stator forming the two plates of a capacitive coupler, said rotating member including a magnetic head having a winding thereon disposed at one point along said annular surface, said magnetic head disposed to rotate past successive ones of the teeth of said stator in close proximity thereto, whereby the rotation of said magnetic head past each of said teeth generates an electric current in the winding of said magnetic head, said rotatable member including a transducer circuit powered by the electric current generated in said magnetic head and capable of generating at an output thereof, an output signal indicative of a property of said rotatable member, said output coupled to said annular member, so that as said rotatable member rotates relative to said stationary body, electric power is generated in said magnetic head and utilized to generate the signal indicative of a property on said rotating member, which signal is coupled through said annular member and said stator to said monitoring means.

2. A power-generating and signal-coupling system according to claim 1 wherein the teeth on said stator extend in a direction parallel with said axis and wherein said annular surface comprises a member having an annular opening in a direction parallel with said axis and oriented toward said nonrotating member and adapted to receive and rotate about said teeth of said stator.

3. A power-generating and signal-coupling system according to claim 1 wherein said teeth are arranged on said stator in a radial direction and said annular surface is perpendicular to said axis.